United States Patent
Schmogrow

(10) Patent No.: US 9,716,564 B2
(45) Date of Patent: Jul. 25, 2017

(54) POLARIZATION TRACKING USING SIGNAL TONE INFORMATION WHILE KEEPING LEAST MEAN SQUARES FREQUENCY DOMAIN EQUALIZATION

(71) Applicant: Infinera Corporation, Sunnyvale, CA (US)

(72) Inventor: Rene Marcel Schmogrow, Santa Clara, CA (US)

(73) Assignee: Infinera Corporation, Sunnyvale, CA (US)

( * ) Notice: Subject to any disclaimer, the term of this patent is extended or adjusted under 35 U.S.C. 154(b) by 27 days.

(21) Appl. No.: 14/581,426

(22) Filed: Dec. 23, 2014

(65) Prior Publication Data
US 2016/0182182 A1 Jun. 23, 2016

(51) Int. Cl.
*H04J 14/06* (2006.01)
*H04B 10/06* (2006.01)
(Continued)

(52) U.S. Cl.
CPC .......... *H04J 14/06* (2013.01); *H04B 10/2569* (2013.01); *H04B 10/2572* (2013.01); *H04B 10/6166* (2013.01)

(58) Field of Classification Search
CPC ...................................................... H04J 14/06
(Continued)

(56) References Cited

U.S. PATENT DOCUMENTS

2002/0067883 A1* 6/2002 Lo ........................ H04B 10/532
385/24
2009/0285582 A1* 11/2009 Miao .................. H04B 10/2569
398/147
(Continued)

FOREIGN PATENT DOCUMENTS

DE WO 2011100867 A1 * 8/2011 ............. H04L 7/027

OTHER PUBLICATIONS

G. Bosco et al., "Experimental Demonstration of a Novel Update Algorithm in Stokes Space for Adaptive Equalization in Coherent Receivers," 2014 European Conference on Optical Communication (ECOC), Cannes—France Tu.3.3.6, Sep. 21-25, 2014, 3 pages.
(Continued)

*Primary Examiner* — David Payne
*Assistant Examiner* — Pranesh Barua
(74) *Attorney, Agent, or Firm* — Harrity & Harrity LLP; David L. Soltz

(57) ABSTRACT

A digital signal processor (DSP) of an optical receiver may receive information representing a polarization multiplexed signal including tone information. The polarization multiplexed signal may have an uncorrected state of polarization (SOP). The DSP may determine sets of Stokes parameters based on the tone information. The DSP may determine a set of polarization parameters based on the sets of Stokes parameters. The DSP may apply, based on the set of polarization parameters, a set of operations to the information representing the polarization multiplexed signal. An operation, of the set of operations, may represent a rotation or a
(Continued)

phase retardation of the polarization multiplexed signal and may correspond to a polarization parameter of the set of polarization parameters. The set of operations may be applied to the information representing the polarization multiplexed signal in order to generate information representing the polarization multiplexed signal with a corrected SOP.

20 Claims, 8 Drawing Sheets

(51) Int. Cl.
 *H04B 10/2569* (2013.01)
 *H04B 10/2507* (2013.01)
 *H04B 10/61* (2013.01)
(58) Field of Classification Search
 USPC .......................... 398/65, 202, 205, 206, 208
 See application file for complete search history.

(56) References Cited

U.S. PATENT DOCUMENTS

| | | | | |
|---|---|---|---|---|
| 2010/0098420 | A1* | 4/2010 | Ibragimov | H04J 14/06 398/65 |
| 2010/0322639 | A1* | 12/2010 | Szafraniec | H04B 10/60 398/202 |
| 2010/0329677 | A1* | 12/2010 | Kaneda | H04B 10/60 398/65 |
| 2011/0033184 | A1* | 2/2011 | Zhang | H04J 14/002 398/65 |
| 2011/0255870 | A1* | 10/2011 | Grigoryan | H04B 10/548 398/65 |
| 2012/0076493 | A1* | 3/2012 | Zhang | H04B 10/2569 398/29 |
| 2012/0219285 | A1* | 8/2012 | Dahan | H04B 10/07953 398/26 |
| 2013/0138375 | A1* | 5/2013 | Zhou | H04B 10/6166 702/66 |
| 2014/0010543 | A1* | 1/2014 | Lee | H04B 10/61 398/79 |
| 2014/0079390 | A1* | 3/2014 | Kim | H04B 10/0773 398/30 |
| 2014/0161452 | A1* | 6/2014 | Okabe | H04J 14/06 398/65 |
| 2014/0369685 | A1* | 12/2014 | Calabro | H04B 10/614 398/65 |
| 2014/0369686 | A1* | 12/2014 | Pelekhaty | H04B 10/6162 398/65 |
| 2014/0376908 | A1* | 12/2014 | Kim | H04B 10/0775 398/26 |
| 2015/0030331 | A1* | 1/2015 | Salsi | H04B 10/614 398/65 |
| 2016/0127048 | A1* | 5/2016 | Kikuchi | H04B 10/0795 398/202 |

OTHER PUBLICATIONS

B. Szafraniec et al., "Polarization demultiplexing in Stokes space," Optical Society of America, Optics Express, vol. 18, No. 17, Aug. 16, 2010, pp. 17928-17939.

M. Morsey-Osman et al., "Ultrafast and low overhead training symbol based channel estimation in coherent M-QAM single-carrier transmission systems," Optical Society of America, Optics Express, vol. 20, No. 26, Dec. 10, 2012, pp. B171-B180.

* cited by examiner

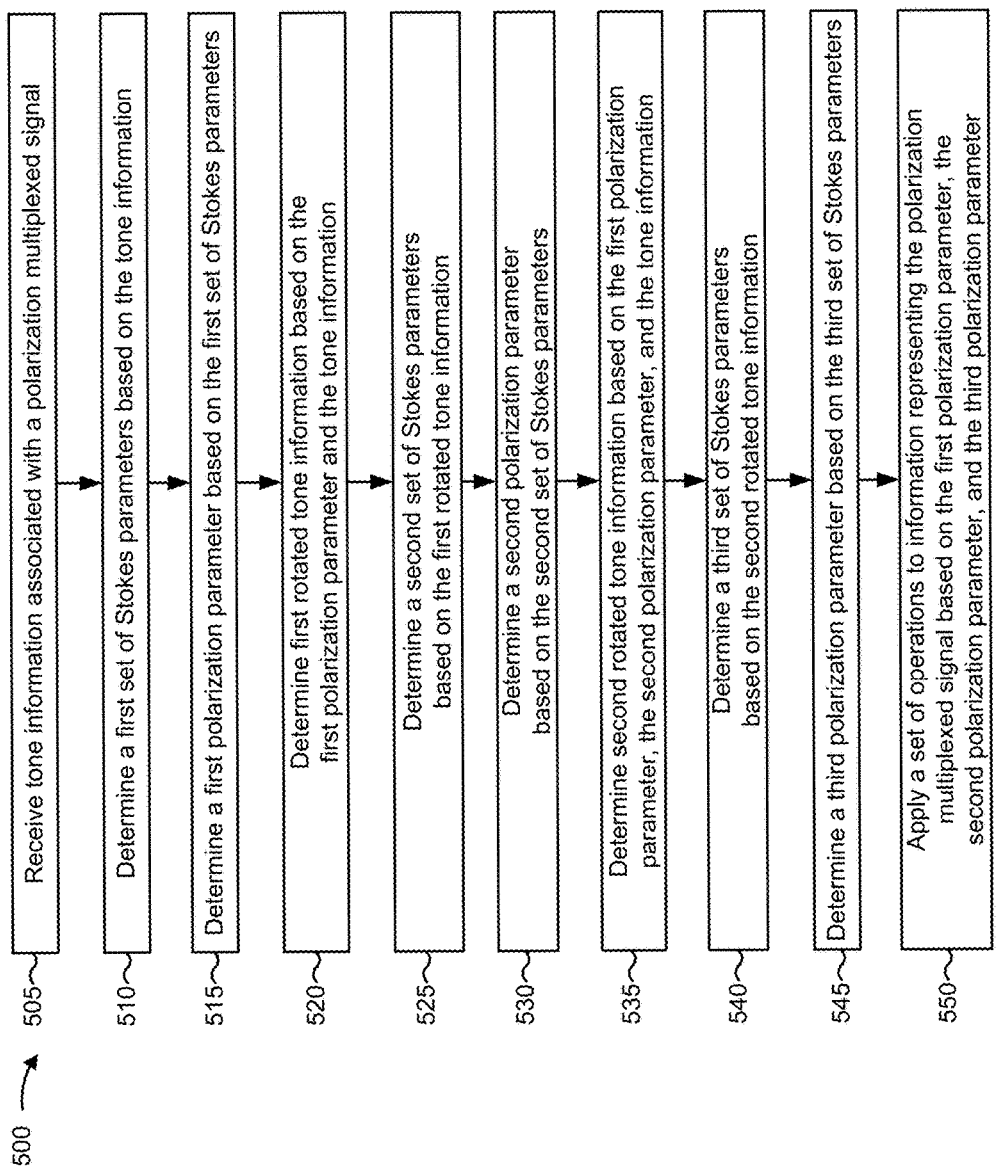

POLARIZATION TRACKING USING SIGNAL TONE INFORMATION WHILE KEEPING LEAST MEAN SQUARES FREQUENCY DOMAIN EQUALIZATION

BACKGROUND

Optical communication systems are known in which optical signals carrying data are transmitted from a first node (e.g., a transmitter (Tx)) to a second node (e.g., a receiver (Rx)) via an optical fiber. At the Rx, the optical signal is converted into corresponding electrical signals, which are then further processed.

In some cases, the Rx may include a coherent Rx. In a coherent Rx, a received signal is mixed with an output of a local oscillator (LO) in an optical hybrid circuit, the outputs of which are provided to photodetectors to generate analog electrical output signals. For example, the analog signals may be sampled at a sample rate by analog-to-digital converter (ADC) circuits configured to supply outputs for further processing by a digital signal processor (DSP) included in the coherent Rx. Thus, for the coherent Rx, the amplitude, phase, and state of polarization of the optical signal are all transferred to the electrical domain for digital signal processing in the Rx DSP.

While travelling through the fiber (e.g., from the Tx to the Rx), the optical signal may experience impairments and/or changes, such as chromatic dispersion (CD), polarization mode dispersion (PMD), and/or a change in a state of polarization. As a result of such impairments and/or changes, electronic signals, representative of data carried by the optical signal, may have different delay, frequency response, and polarization characteristics.

SUMMARY

According to some possible implementations, an optical receiver may comprise a digital signal processor (DSP) configured to: receive information representing a polarization multiplexed signal, where the information representing the polarization multiplexed signal may include first information associated with a first data rate, and second information associated with a second data rate different than the first data rate, where the second information may be tone information representing a set of tones associated with performing carrier recovery for the polarization multiplexed signal, and where the polarization multiplexed signal may have an uncorrected state of polarization (SOP); determine sets of Stokes parameters based on the tone information, where a set of Stokes parameters, of the sets of Stokes parameters, may include information indicative of the SOP of the polarization multiplexed signal; determine a set of polarization parameters based on the sets of Stokes parameters; and apply, based on the set of polarization parameters, a set of operations to the information representing the polarization multiplexed signal, where an operation, of the set of operations, may represent a rotation or a phase retardation of the polarization multiplexed signal and may correspond to a polarization parameter of the set of polarization parameters, and where the set of operations may be applied to the information representing the polarization multiplexed signal in order to generate corrected information, where the corrected information may include information representing the polarization multiplexed signal with a corrected SOP.

According to some possible implementations, a system may comprise an optical receiver configured to: obtain information that represents a polarization multiplexed signal, where the information that represents the polarization multiplexed signal may include first information and second information, where the second information may be tone information that represents a set of tones associated with performing carrier recovery for the polarization multiplexed signal, and where the polarization multiplexed signal may have an uncorrected state of polarization (SOP); compute Stokes parameters based on the tone information, where a subset of Stokes parameters, of the Stokes parameters, may include information indicative of the SOP of the polarization multiplexed signal; compute a group of polarization parameters based on the Stokes parameters; apply, based on the group of polarization parameters, a plurality of operations to the information that represents the polarization multiplexed signal, where an operation, of the plurality of operations, may represent a rotation or a phase retardation of the polarization multiplexed signal and may correspond to a polarization parameter of the group of polarization parameters, and where the plurality of operations may be applied to the information that represents the polarization multiplexed signal in order to generate corrected information that includes information that represents the polarization multiplexed signal with a corrected SOP.

According to some possible implementations, a method may comprise: receiving, by a digital signal processor (DSP), information representing a polarization multiplexed signal, where the information representing the polarization multiplexed signal may include tone information representing a set of tones associated with performing carrier recovery for the polarization multiplexed signal, and where the polarization multiplexed signal may have an uncorrected state of polarization (SOP); determining, by the DSP, a first set of Stokes parameters based on the tone information, where the first set of Stokes parameters may include information indicative of the uncorrected SOP of the polarization multiplexed signal; determining, by the DSP, a first polarization parameter based on the first set of Stokes parameters, where the first polarization parameter may correspond to a first operation to be applied to the information representing the polarization multiplexed signal; determining, by the DSP, a second set of Stokes parameters based on the tone information and the first polarization parameter, where the second set of Stokes parameters may include information indicative of a SOP of the polarization multiplexed signal that results from applying a first rotation or a first phase retardation to the polarization multiplexed signal, where the first rotation or the first phase retardation may correspond to the first operation to be applied to the information representing the polarization multiplexed signal; determining, by the DSP, a second polarization parameter based on the second set of Stokes parameters, where the second polarization parameter may correspond to a second operation to be applied to the information representing the polarization multiplexed signal; determining, by the DSP, a third set of Stokes parameters based on the tone information, the first polarization parameter, and the second polarization parameter, where the third set of Stokes parameters may include information indicative of a SOP of the polarization multiplexed signal that results from applying the first rotation or the first phase retardation and a second rotation or a second phase retardation to the polarization multiplexed signal, where the second rotation or the second phase retardation may correspond to the second operation to be applied to the information representing the polarization multiplexed signal; determining, by the DSP, a third polarization parameter based on the third set of Stokes parameters, where the third polarization parameter may correspond to a third operation to be applied to the information representing the polarization multiplexed signal; and applying, by the DSP, the first operation, the second operation, and the third operation, corresponding to the first polarization parameter, the second polarization parameter, and the third polarization parameter, respectively, to the information representing the polarization multiplexed signal, where the first operation, the second operation, and the third operation may be applied to the information representing the polarization multiplexed signal in order to generate corrected information, where the corrected information may include information representing the polarization multiplexed signal with a corrected SOP.

BRIEF DESCRIPTION OF THE DRAWINGS

FIG. 5 is a flow chart of an example process for applying, to information representing a polarization multiplexed signal, a set of operations representing a correction of a state of polarization of the polarization multiplexed signal using a set of polarization parameters determined based on tone information included in the information representing the polarization multiplexed signal.

DETAILED DESCRIPTION

The following detailed description of example implementations refers to the accompanying drawings. The same reference numbers in different drawings may identify the same or similar elements.

Polarization tracking (e.g., determining a state of polarization of a polarization multiplexed signal) may be needed for coherent optical communications when data is sent on two orthogonal polarizations. Existing techniques for polarization tracking and/or demultiplexing may rely on a least mean squares (LMS) equalizer included in a coherent Rx. However, the polarization tracking speed of the LMS equalizer may be limited (e.g., to some tens of kilohertz (kHz)) in some cases. With some time domain LMS equalizer implementations, a faster polarization tracking speed (e.g., of a few hundred kHz) may be theoretically achieved. However, ultra-fast polarization changes (e.g., many hundreds of kHz, thousands of kHz) may occur along an optical fiber. Existing LMS equalizer implementations may be insufficient to track such speeds of polarization change. This may lead to uncorrected code words, loss of frames, loss of lock, or the like.

Implementations described herein may describe an optical receiver configured to use received tone information (e.g., information representing a set of tones, associated with performing carrier recovery, included in a polarization multiplexed signal) as a complement to an LMS equalizer for purposes of performing (e.g., ultra-fast) polarization tracking. In some aspects, the received tone information may be converted to Stokes parameters that describe a state of polarization (SOP) of the received polarization multiplexed signal. In conjunction with a known SOP of the polarization multiplexed signal (e.g., at transmission), a SOP change may be determined and the optical receiver may correct the SOP of the polarization multiplexed signal accordingly.

Figure 1:
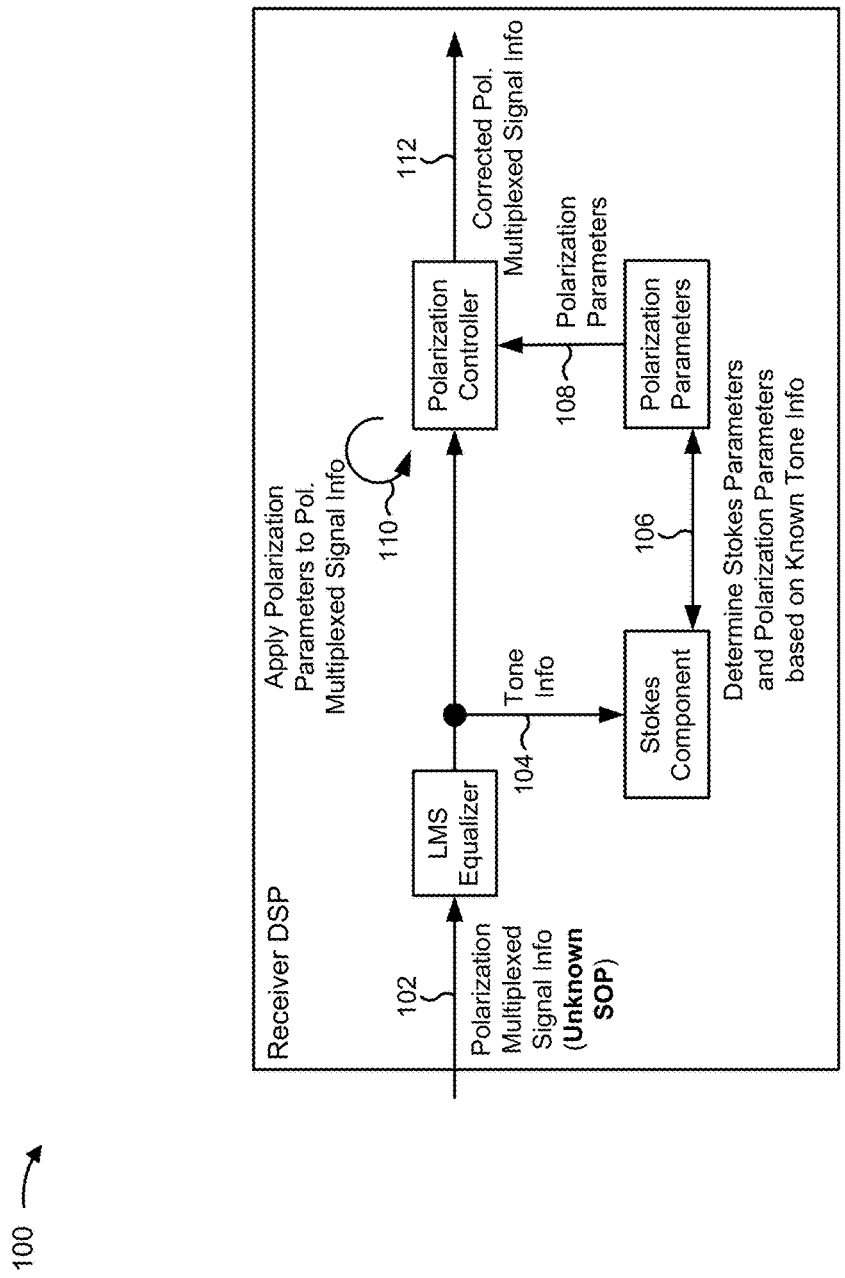
FIG. 1 is a diagram of an overview of an example implementation described herein.

FIG. 1 is a diagram of an overview of an example implementation 100 described herein. For the purposes of example implementation 100, assume that a coherent Rx includes a digital signal processor (DSP) associated with performing polarization tracking and demultiplexing polarization multiplexed signals.

As shown in FIG. 1, and by reference number 102, an LMS equalizer, included in the Rx DSP, may receive information representing a polarization multiplexed signal with an unknown state of polarization (SOP). In some implementations, the information representing polarization multiplexed signal may include first information (e.g., transmitted data, a payload, etc.) associated with a first data rate, and second information (e.g., tone information, such as a set of block tones, a set of pilot tones, etc.) associated with a second data rate that is different than (e.g., less than, greater than, etc.) the first data rate. As shown, after performing one or more equalizer functions (e.g., adaptive LMS filtering, CD compensation, PMD compensation, etc.), the LMS equalizer may pass the information representing the polarization multiplexed signal to a polarization controller, included in the Rx DSP, that is positioned to apply a set of operations to the information representing the polarization multiplexed signal, where applying the set of operations may represent correcting a SOP of the polarization multiplexed signal, as described below.

Assume that the Rx DSP is configured such that the information representing the polarization multiplexed signal is tapped and gated in order to receive tone information (e.g., a set of block tones, a set of pilot tones, etc.) included in the information representing the polarization multiplexed signal. As shown by reference number 104, the tone information may be provided to a Stokes component of the Rx DSP (e.g., a component configured to determine Stokes parameters based on the tone information). As shown by reference number 106, the Stokes component may communicate with a polarization parameters component, included in the Rx DSP, in order to determine the Stokes parameters and a set of polarization parameters (e.g., a set of parameters associated with applying a set of operations to the information representing information representing the polarization multiplexed signal, where applying the set of operations may represent correcting the SOP of the polarization multiplexed signal) based on the tone information.

As shown by reference number 108, the polarization parameters component may provide the set of polarization parameters to the polarization controller. As shown by reference number 110, the polarization controller may, based on the set of polarization parameters received from the polarization parameters component, apply a set of operations, corresponding to the polarization parameters, to the information representing the received polarization multiplexed signal. As shown by reference number 112, the polarization controller may also process (e.g., demultiplex) the corrected information representing the polarization multiplexed signal and/or may provide the corrected information representing the polarization multiplexed signal for further processing (e.g., carrier recovery, error signal computation, etc.) and/or output. In this way, an optical receiver may use tone information (e.g., a set of block tones, a set of pilot tones, etc.), included in information representing a polarization multiplexed signal, in order to complement an LMS equalizer for the purpose of performing (e.g., ultra-fast) polarization tracking.

Figure 2:
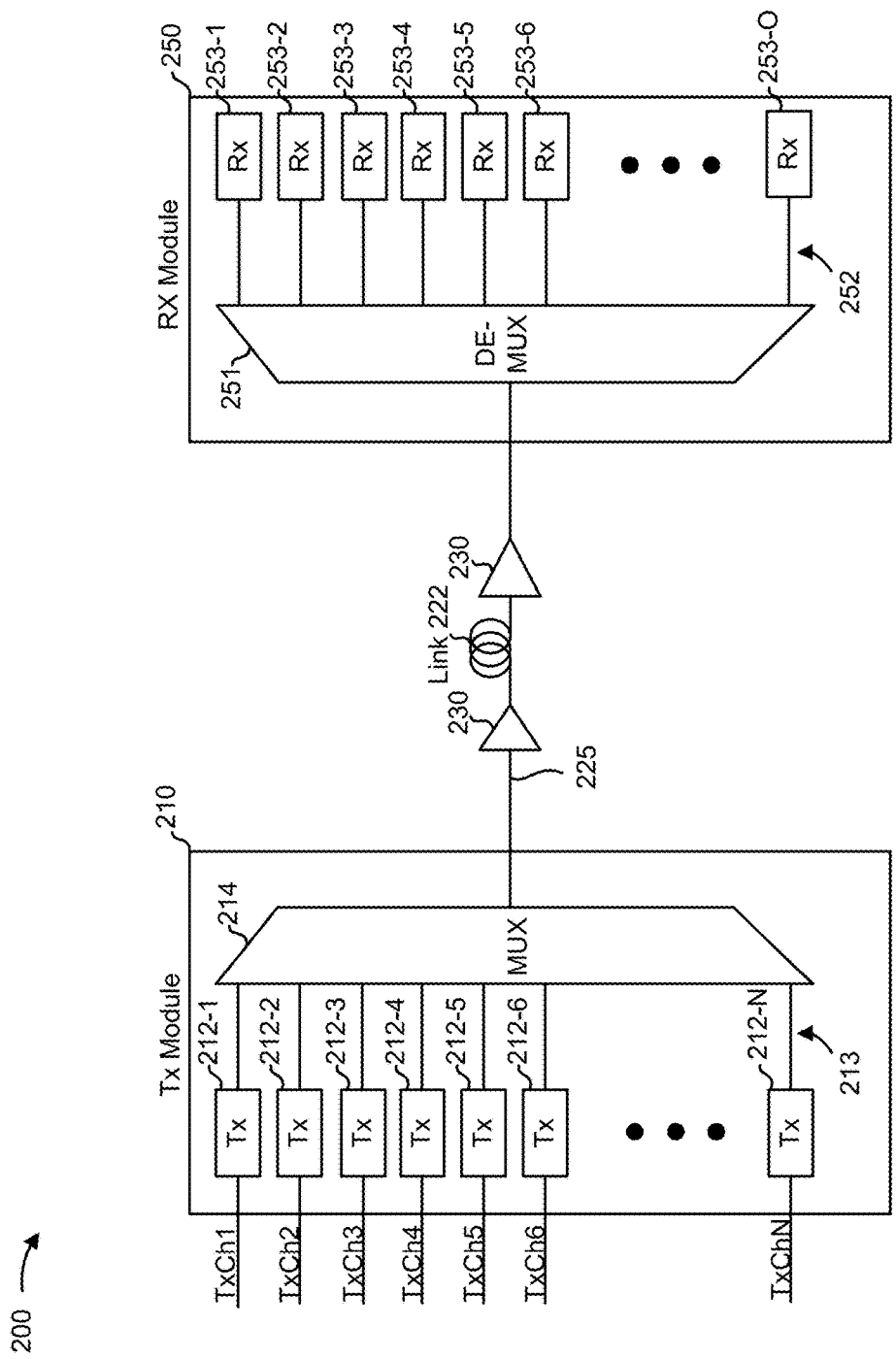
FIG. 2 is a diagram of an example network in which systems and/or methods, described herein, may be implemented.

FIG. 2 is a diagram of an example network 200 in which systems and/or methods, described herein, may be implemented. As shown in FIG. 2, network 200 may include transmitter module 210 (e.g., a Tx PIC) and/or receiver module 250 (e.g., an Rx PIC). In some implementations, transmitter module 210 may be optically connected to receiver module 250 via link 222 and/or optical amplifiers 230. Link 222 may include one or more optical amplifiers 230 that amplify an optical signal as the optical signal is transmitted over link 222.

Transmitter module 210 may include a number of optical transmitters 212-1 through 212-N (N≥1), waveguides 213, and/or optical multiplexer 214. Each optical transmitter 212 may receive a data channel (TxCh1 through TxChN), may modulate the data channel with an optical signal, and may transmit the data channel as an optical signal. In some implementations, transmitter module 210 may include 5, 10, 20, 50, 100, or some other number of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T).

Waveguides 213 may include optical links to transmit modulated outputs (referred to as "signal channels") of optical transmitters 212. In some implementations, each optical transmitter 212 may connect to one waveguide 213 or to multiple waveguides 213 to transmit signal channels of optical transmitters 212 to optical multiplexer 214. In some implementations, waveguides 213 may be made from a birefringent material and/or some other material.

Optical multiplexer 214 may include an arrayed waveguide grating (AWG) or some other multiplexing device. In some implementations, optical multiplexer 214 may combine multiple signal channels, associated with optical transmitters 212, into a wave division multiplexed (WDM) signal, such as optical signal 225.

As further shown in FIG. 2, receiver module 250 may include optical demultiplexer 251, waveguides 252, and/or optical receivers 253-1 through 253-O (O≥1). In some implementations, optical demultiplexer 251 may include an AWG or some other demultiplexing device. Optical demultiplexer 251 may supply multiple signal channels based on a received WDM signal (e.g., optical signal 225). As shown in FIG. 2, optical demultiplexer 251 may supply signal channels to optical receivers 253 via waveguides 252.

Waveguides 252 may include optical links to transmit outputs of optical demultiplexer 251 to optical receivers 253. In some implementations, each optical receiver 253 may receive outputs via a single waveguide 252 or via multiple waveguides 252. In some implementations, waveguides 252 may be made from a birefringent material and/or some other kind of material.

Optical receivers 253 may each operate to convert an input optical signal to an electrical signal that represents the transmitted data. In some implementations, optical receivers 253 may each include one or more photodetectors and/or related devices to receive respective input optical signals outputted by optical demultiplexer 251 and a local oscillator, convert the signals to a photocurrent, and provide a voltage output to function as an electrical signal representation of the original input signal.

The number and arrangement of devices shown in FIG. 2 are provided for explanatory purposes. In practice, there may be additional devices, fewer devices, different devices, or differently arranged devices than those shown in FIG. 2. Furthermore, two or more of the devices shown in FIG. 2 may be implemented within a single device, or a single device shown in FIG. 2 may be implemented as multiple, distributed devices. Additionally, or alternatively, one or more of the devices of network 200 may perform one or more functions described as being performed by another one or more of the devices of network 200.

Figure 3:
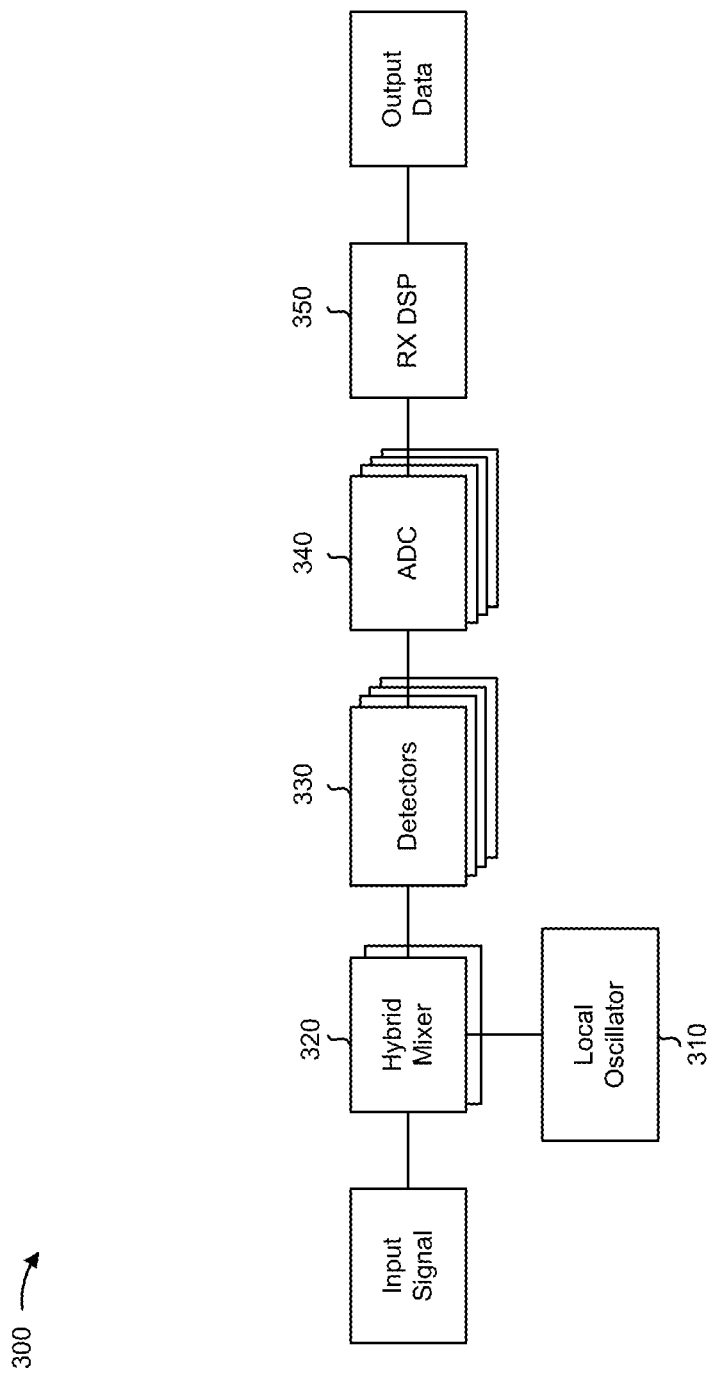
FIG. 3 is a diagram of example components of an optical receiver shown in FIG. 2.

FIG. 3 is a diagram of example components of optical receiver 253 as shown in network 200 of FIG. 2. As shown in FIG. 3, optical receiver 253 may include a local oscillator 310, one or more hybrid mixers 320, one or more detectors 330, one or more analog-to-digital converters (ADCs) 340, and/or an Rx DSP 350. In some implementations, local oscillator 310, hybrid mixer 320, detectors 330, ADCs 340, and/or Rx DSP 350 may be implemented on one or more integrated circuits, such as one or more PICs, one or more ASICs, etc.

Local oscillator 310 may include a laser device. In some implementations, local oscillator 310 may provide a reference signal to hybrid mixer 320. In some implementations, local oscillator 310 may include a single-sided laser to provide an optical signal to hybrid mixer 320. In some other implementations, local oscillator 310 may include a double-sided laser to provide multiple optical signals to multiple hybrid mixers 320. In some implementations, a phase, intensity, and/or amplitude of the reference signal may be compared to a phase, intensity, and/or amplitude of an input signal (e.g., a WDM signal supplied by optical demultiplexer 251 and corresponding to an output signal provided by transmitter module 210) to recover data carried by the input signal.

Hybrid mixer 320 may include one or more optical devices to receive an input signal (e.g., a WDM signal supplied by optical demultiplexer 251 and corresponding to an output signal provided by transmitter module 210). In some implementations, hybrid mixer 320 may receive a reference signal from local oscillator 310. In some implementations, hybrid mixer 320 may supply components associated with the input signal and the reference optical signal to detectors 330. For example, hybrid mixer 320 may supply an in-phase x-polarization (e.g., x-pol) component, a quadrature x-pol component, an in-phase y-polarization (e.g., y-pol) component, and a quadrature y-pol component. In some implementations, a first hybrid mixer 320 may provide the in-phase x-pol component and the quadrature x-pol component, and a second hybrid mixer 320 may provide the in-phase y-pol component and the quadrature y-pol component.

Detector 330 may include one or more photodetectors, such as a photodiode, to receive the output optical signal, from hybrid mixer 320, and convert the output optical signal to corresponding voltage signals. In some implementation, optical receiver 253 may include multiple detectors 330 for in-phase x-pol components, quadrature x-pol components, in-phase y-pol components, and quadrature y-pol components. In some implementations, detectors 330 may include one or more balanced pairs of photodetectors. For example, detectors 330 may include a first pair of photodetectors to receive an in-phase x-pol component, and a second pair of photodetectors to receive a quadrature x-pol component. Additionally, detectors 330 may include a third pair of photodetectors to receive an in-phase y-pol component, and a fourth pair of photodetectors to receive a quadrature y-pol component.

ADC 340 may include an analog-to-digital converter that converts the voltage signals from detector 330 to digital signals. ADC 340 may provide the digital signals to Rx DSP 350. In some implementations, optical receiver 253 may include four ADCs 340 or some other number of ADCs 340 (e.g., one ADC 340 for each electrical signal output by detectors 330).

Rx DSP 350 may include a digital signal processing device or a collection of digital signal processing devices. Rx DSP 350 is implemented in hardware, firmware, or a combination of hardware and software. In some implementations, Rx DSP 350 may receive digital signals from ADCs 340 and may process the digital signals to form output data associated with the input signal received by hybrid mixer 320. In some implementations, Rx DSP 350 may be capable of determining a set of polarization parameters associated with correcting a state of polarization of a received polarization multiplexed signal, as described below. Additional details regarding Rx DSP 350 are described below with regard to FIGS. 4A-4C.

While FIG. 3 shows optical receiver 253 as including a particular quantity and arrangement of components, in some implementations, optical receiver 253 may include additional components, fewer components, different components, or differently arranged components.

Figure 4A:
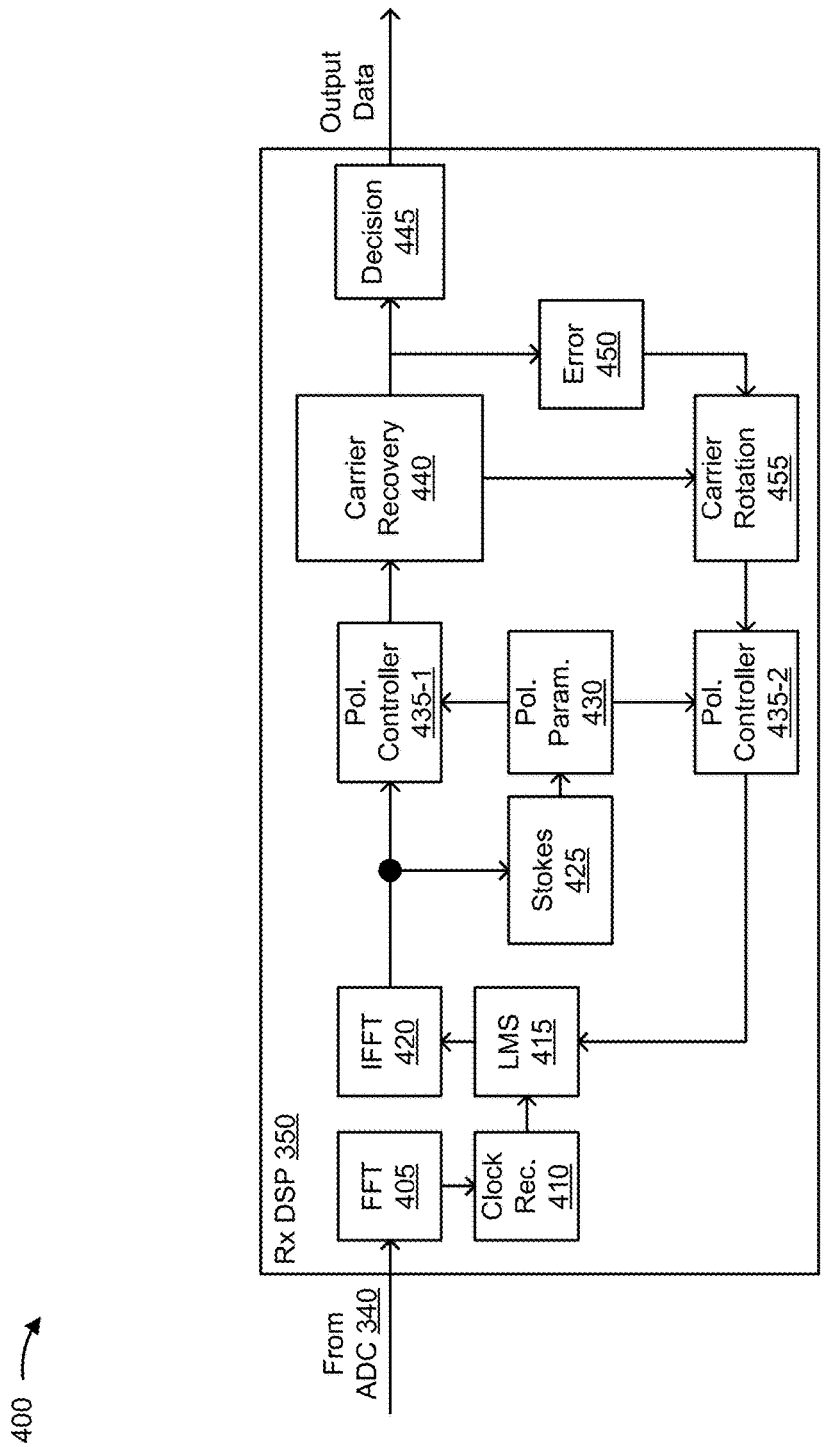
FIGS. 4A-4C are diagrams of example components of a receiver digital signal processor shown in FIG. 3.
Figure 4B:
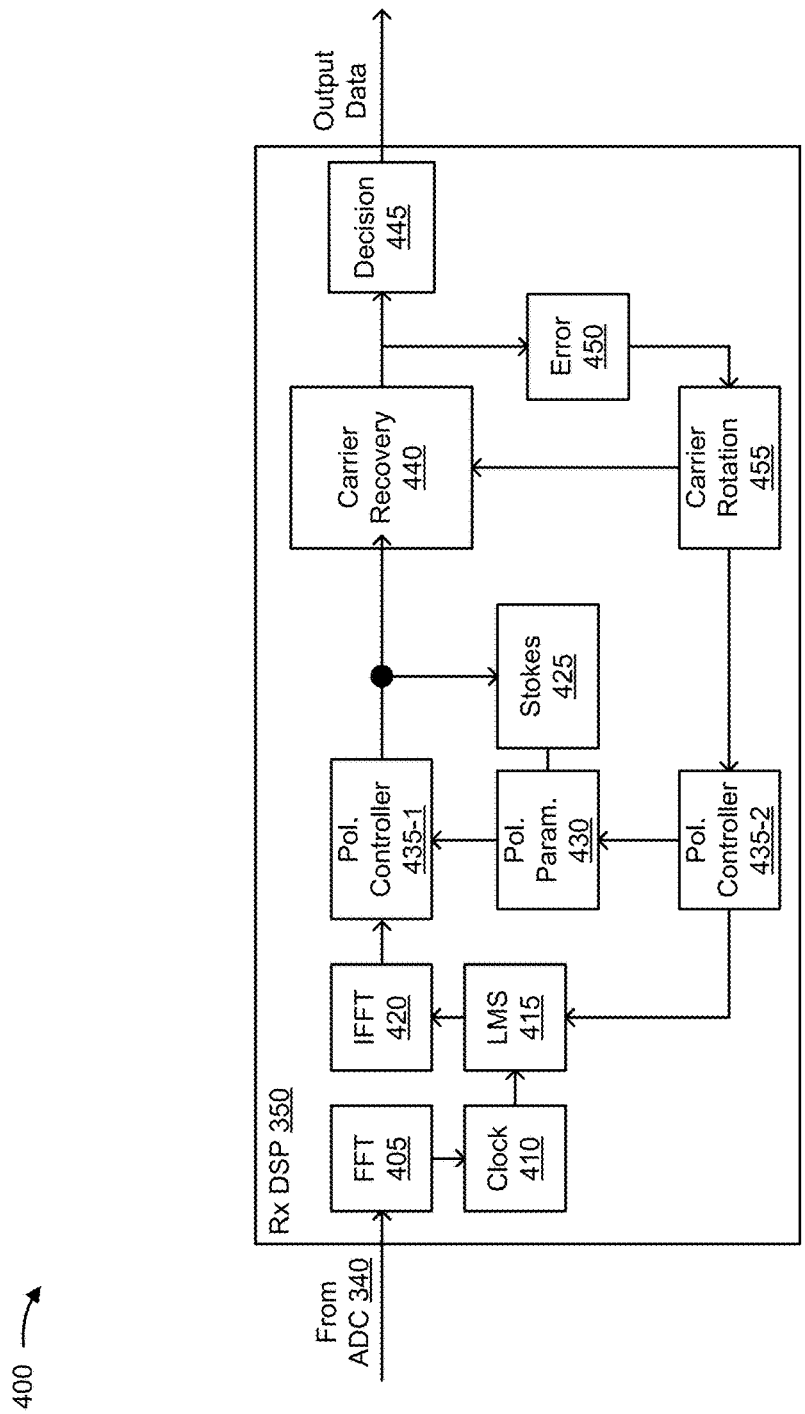
Figure 4C:
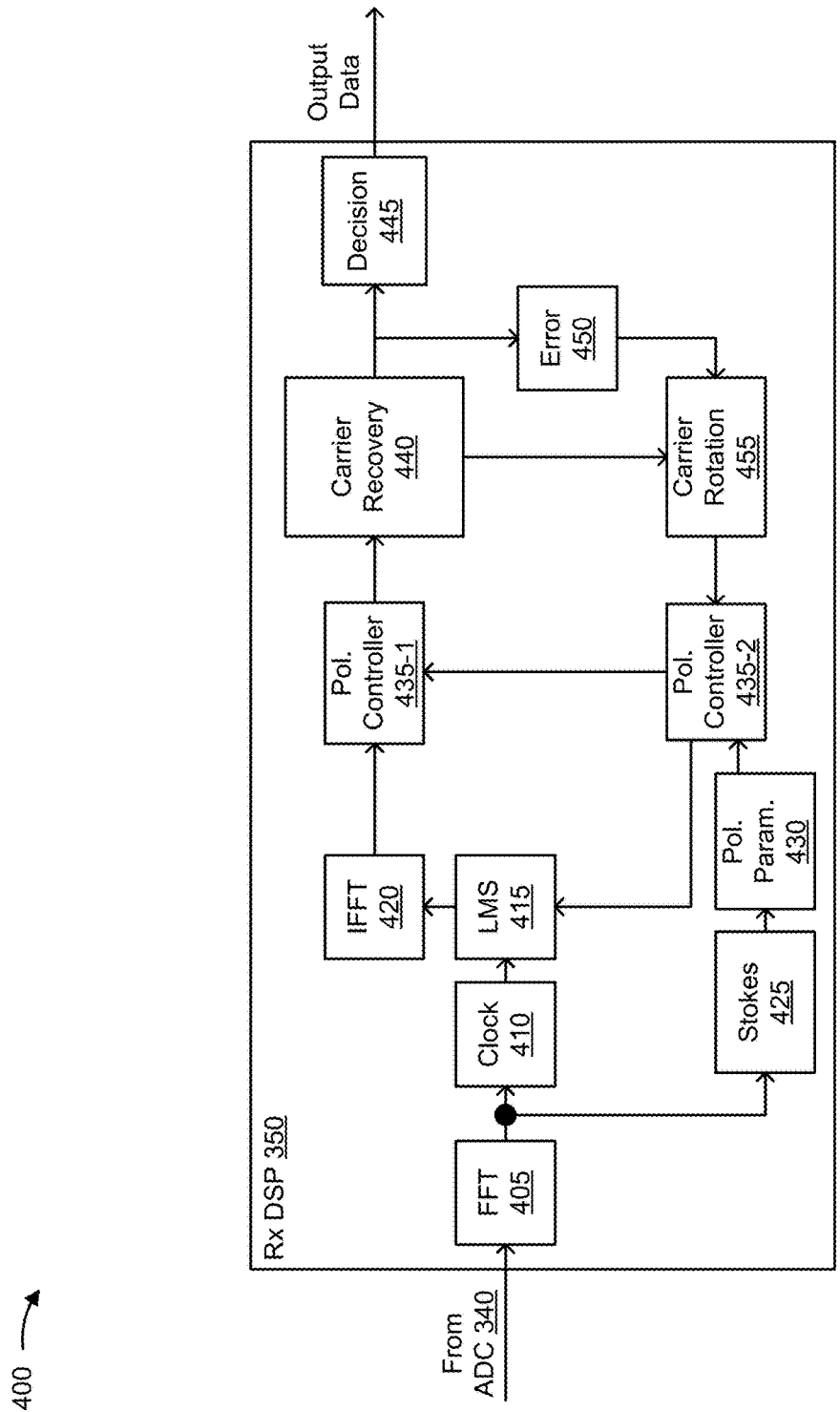

FIGS. 4A-4C are diagrams of example components of Rx DSP 350 as shown in FIG. 3. FIG. 4A is a diagram of an example feed forward arrangement of example components of Rx DSP 350. As shown in FIG. 4A, Rx DSP 350 may include a fast Fourier transform (FFT) component 405, a clock recovery component 410, a least mean squared (LMS) equalizer 415, an inverse FFT (IFFT) component 420, a Stokes component 425, a polarization parameters component 430, a pair of polarization controllers 435 (e.g., polarization controller 435-1 and polarization controller 435-2), a carrier recovery component 440, a decision component 445, an error component 450, and a carrier rotation component 455.

FFT component 405 may transform information representing a polarization multiplexed signal to the frequency domain. In some implementations, FFT component 405 may transform the information representing the polarization multiplexed signal (e.g., from the time domain) to the frequency domain using a fast Fourier transform. In some implementations, FFT component 405 may receive the information representing the polarization multiplexed signal from ADC 340, and may transform the information representing the polarization multiplexed signal to the frequency domain such that another component of Rx DSP 350 (e.g., LMS equalizer 415) may perform a function (e.g., adaptive LMS filtering, CD compensation, PMD compensation, etc.) in the frequency domain. In some implementations, FFT component 405 may transform the information representing the polarization multiplexed signal, and may provide the information representing the polarization multiplexed signal to clock recovery component 410.

Clock recovery component 410 may recover a clock and/or timing information associated with information representing a polarization multiplexed signal, received by Rx DSP 350, in order to allow Rx DSP 350 to synchronously process the information representing the polarization multiplexed signal. In some implementations, clock recovery component 410 may recover the clock (e.g., using a phase locked loop), and may provide the information representing the polarization multiplexed signal to LMS equalizer 415.

LMS equalizer 415 may execute equalization algorithms and/or may receive a polarization multiplexed signal, filter the signal to remove undesired impairments due to channel and/or hardware imperfection (e.g., by performing adaptive LMS filtering, CD compensation, PMD compensation, etc.), and provide an equalized information representing the polarization multiplexed signal. In some implementations, LMS equalizer 415 may receive information representing a polarization multiplexed signal from clock recovery component 410, may equalize the information representing the polarization multiplexed signal, and may provide the equalized information representing the polarization multiplexed signal to IFFT component 420. While FIGS. 4A-4C show LMS equalizer 415 as being positioned such that LMS equalizer 415 performs filtering in the frequency domain, in some implementations, LMS equalizer 415 may be positioned and/or configured such that LMS equalizer 415 performs filtering in the time domain (e.g., after IFFT component 420 transforms the polarization multiplexed signal to the time domain).

IFFT component 420 may transform information representing a polarization multiplexed signal from the frequency domain to the time domain. In some implementations, IFFT may transform the information representing the polarization multiplexed signal from the frequency domain to the time domain, using an inverse fast Fourier transform (i.e., an inverse operation to that performed by FFT component 405). In some implementations, IFFT component 420 may receive information representing an equalized polarization multiplexed signal from LMS equalizer 415, and may transform the information representing the equalized polarization multiplexed signal from the frequency domain to the time domain such that another component of Rx DSP 350 (e.g., polarization controller 435) may further process the information representing the polarization multiplexed signal, as described below. In some implementations, IFFT component 420 may transform the information representing the polarization multiplexed signal from the frequency domain to the time domain, and may provide the information representing the polarization multiplexed signal to polarization controller 435-1 and/or Stokes component 425.

Stokes component 425 may receive tone information (e.g., a set of block tones, a set of pilot tones, etc.) included in information representing a polarization multiplexed signal. In some implementations, the information representing the polarization multiplexed signal may be tapped, gated, split, filtered, or the like, within Rx DSP 350 such that Stokes component 425 receives only tone information included in the information representing the polarization multiplexed signal. For example, if the information representing the polarization multiplexed signal includes information that represents a block tone in every one-hundredth symbol, then the information representing the polarization multiplexed signal may be tapped (e.g., based on information received by Rx DSP 350 during link acquisition) such that Stokes component 425 receives only every one-hundredth symbol (i.e., only those symbols associated with block tones). In some implementations, Stokes component 425 may be capable of determining Stokes parameters, associated with the polarization multiplexed signal, based on the tone information received by Stokes component 425. Additionally, or alternatively, Stokes component 425 may communicate with polarization parameters component 430 in order to determine the Stokes parameters. Additional details regarding the operation of Stokes component 425 are described below.

Polarization parameters component 430 may determine a set of polarization parameters based on the set of Stokes parameters (e.g., determined by Stokes component 425). In some implementations, polarization parameters component 430 may include a lookup table (LUT). Additionally, or alternatively, polarization parameters component 430 may be capable of computing the set of polarization parameters based on the Stokes parameters determined by Stokes component 425, in the manner described below. In some implementations, polarization parameters component 430 may provide the set of polarization parameters to polarization controller 435-1 and/or polarization controller 435-2. Additional details regarding the operation of polarization parameters component 430 are described below.

Polarization controller 435-1 may include a component associated with applying operations (e.g., each operation representing a rotation or a phase retardation associated with correcting a SOP of the polarization multiplexed signal) to information representing a polarization multiplexed signal based on a set of polarization parameters (e.g., determined by polarization parameters component 430). In some implementations, polarization controller 435-1 may include a one-tap butterfly filter that includes up to four complex multipliers, and/or another type of filter. In some implementations, polarization controller 435-1 may demultiplex information representing a corrected polarization multiplexed signal and/or may provide (e.g., to carrier recovery component 440) the demultiplexed information representing the corrected polarization multiplexed signal for further processing. Additional details regarding the operation of polarization controller 435-1 are described below.

Polarization controller 435-2 may include a component associated with reversing an effect of operations applied to the information representing the polarization multiplexed signal on an error signal (e.g., computed by error component 450) based on the set of polarization parameters (e.g., determined by polarization parameters component 430). In some implementations, polarization controller 435-2 may include a one-tap butterfly filter that includes up to four complex multipliers and/or another type of filter. In some implementations, polarization controller 435-2 may be positioned such that polarization controller 435-2 may reverse the effect of the operations on the error signal before the error signal is provided to LMS equalizer 415 (e.g., for adaptation purposes).

Carrier recovery component 440 may receive (e.g., from polarization controller 435-1) a corrected demultiplexed signal and may perform phase correction to remove phase noise from the demultiplexed signal (e.g., phase noise associated with Tx and/or Rx lasers, such as local oscillator 310). In some implementations, carrier recovery component 440 may operate in different modulation formats (e.g., a quadrature phase key shifting (QPSK) format, a 16 quadrature amplitude modulation (16QAM) format, etc.). In some implementations, recovery component 440 may output information representing a phase-corrected demultiplexed signal to decision component 445. Additionally, or alternatively, carrier recovery component 440 may provide, to carrier rotation component 455, carrier rotation information associated with the phase correction performed by carrier recovery component 440.

Decision component 445 may receive the information representing the phase-corrected demultiplexed signal and may identify bits associated with the information representing the phase-corrected demultiplexed signal. In some implementations, decision component 445 may receive the information representing the phase-corrected demultiplexed signal, identify symbol values associated with the information representing the phase-corrected demultiplexed signal, and identify a bit word associated with the symbol values. For example, decision component 445 may perform a function that is inverse to a symbol mapper component of optical transmitter 212 (e.g., a component that modulates a signal).

Error component 450 may compute a difference between a signal output by carrier recovery component 440 and a signal output by LMS equalizer 415. In some implementations, error component 450 may provide the error signal to allow LMS equalizer 415 to perform adaptive filtering. In some implementations, the error signal may be modified (e.g., by carrier rotation component 455) based on carrier rotation information, associated with a phase correction performed by carrier recovery component 440, in order to undo the effect of the phase correction. Additionally, or alternatively, the error signal may be modified (e.g., by polarization controller 435-2) based on the set of polarization parameters, associated with the operations performed by polarization controller 435-1, in order to undo the effect of the operations.

Carrier rotation component 455 may include a component associated with reversing an effect of a phase correction, based on carrier rotation information (e.g., provided by carrier recovery component 440), on an error signal (e.g., computed by error component 450). In some implementations, carrier rotation component 455 may be positioned such that carrier rotation component 455 may reverse the effect of the phase correction on the error signal before the error signal is provided to polarization controller 435-2 and/or LMS equalizer 415.

While FIG. 4A describes the example components of Rx DSP 350 as being positioned in an example feed forward arrangement, in some implementations, the example components of Rx DSP 350 may be arranged in another manner, such as a feedback loop arrangement. FIG. 4B shows an example feedback loop arrangement of the example components of Rx DSP 350. In some implementations, a feedback loop arrangement may reduce an amount of computing resources needed to perform operations representing a correction of a SOP of a polarization multiplexed signal (e.g., as compared to the example feed forward arrangement). However, the example feed forward arrangement may allow for an increased speed at which the operations may be performed (e.g., as compared to the example feedback loop arrangement). In some implementations, the tone information may also be determined from payload data with a decision directed algorithm such that no overhead is generated and the correction becomes non-data aided.

In some implementations, Rx DSP 350 may be configured such that operations representing a correction of a SOP of a polarization multiplexed signal may be performed based on tone information representing block tones. For example, the example feed forward arrangement and the example feedback loop arrangement of FIGS. 4A and 4B, respectively, show example arrangements that may allow the operations representing the SOP correction to be performed based on block tones included in the polarization multiplexed signal.

Additionally, or alternatively, Rx DSP 350 may be configured such that operations representing a correction of a SOP of a polarization multiplexed signal may be performed based on tone information representing (e.g., out-of-band) pilot tones. FIG. 4C shows an example arrangement of the example components of Rx DSP 350 such that the operations representing the SOP correction to be corrected based on pilot tones. As shown in FIG. 4C, the example components of Rx DSP 350 may be arranged such that information representing the pilot tones is received by Stokes component 425 before the information representing the polarization multiplexed signal is transformed to the time domain by IFFT 420 (e.g., rather than Stokes component 425 receiving the known block tones after the information representing the polarization multiplexed signal is transformed to the time domain by IFFT 420 as described with respect to FIGS. 4A and 4B). Alternatively, in some implementations, the information representing the pilot tones may be received by Stokes component 425 after the information representing the polarization multiplexed signal is transformed to the time domain by IFFT 420. In some implementations, use of the pilot tones may simplify computation of the polarization parameters as compared to use of block tones (e.g., by allowing two measurements to be simultaneously determined). Additionally, or alternatively, use of the pilot tones may allow for continuous tracking (e.g., whereas use of block tones may not allow for continuous tracking since the block tones are not continuously received). However, use of block tones may allow for a lower signal power associated with transmitting the polarization multiplexed signal (e.g., as compared to using pilot tones).

While FIGS. 4A-4C show Rx DSP 350 as including particular quantities and particular arrangements of components, in some implementations, Rx DSP 350 may include additional components, fewer components, different components, or differently arranged components than those shown in FIGS. 4A-4C.

FIG. 5 is a flow chart of an example process 500 for applying, to information representing a polarization multiplexed signal, a set of operations representing a correction of a state of polarization of the polarization multiplexed signal using a set of polarization parameters determined based on tone information included in the information representing the polarization multiplexed signal. In some implementations, one or more process blocks of FIG. 5 may be performed by one or more components of Rx DSP 350. In some implementations, one or more process blocks of FIG. 5 may be performed by another component or a group of components included in or separate from Rx DSP 350, such as by one or more other components of optical receiver 253.

Figure 6:
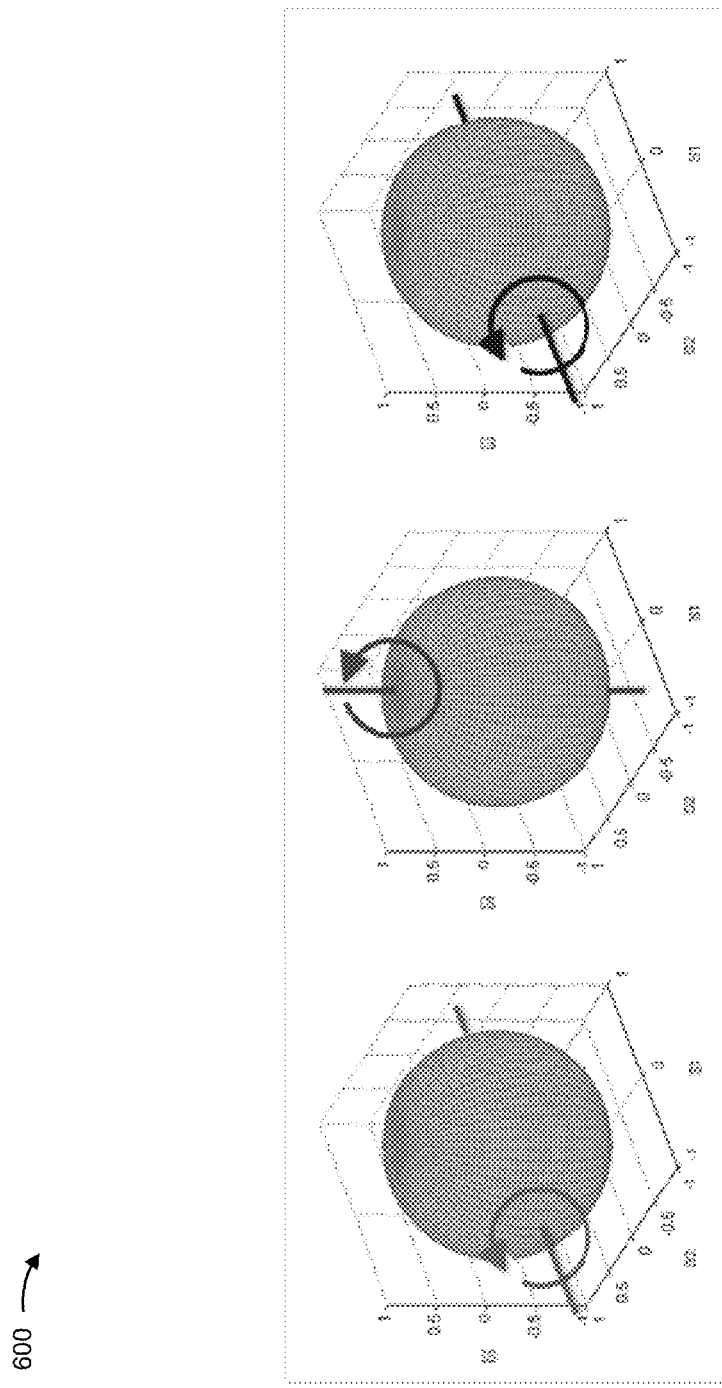
FIG. 6 is a diagram of a manner in which a state of polarization change may be expressed using three rotations of a Stokes space spherical coordinate system.

A SOP change induced by a transmission medium (e.g., a fiber) may be described by the following Jones matrices:

$$E_{out} = \begin{pmatrix} e^{j\phi} & 0 \\ 0 & e^{-j\phi} \end{pmatrix} \begin{pmatrix} \cos\alpha & -\sin\alpha \\ \sin\alpha & \cos\alpha \end{pmatrix} \begin{pmatrix} e^{j\varphi} & 0 \\ 0 & e^{-j\varphi} \end{pmatrix} E_{in} e^{j\beta}$$

$$E_{out} = \begin{pmatrix} e^{j\phi} & 0 \\ 0 & e^{-j\phi} \end{pmatrix} \begin{pmatrix} \cos\alpha e^{j\varphi} & -\sin\alpha e^{-j\varphi} \\ \sin\alpha e^{j\varphi} & \cos\alpha e^{-j\varphi} \end{pmatrix} E_{in} e^{j\beta}$$

$$E_{out} = \begin{pmatrix} \cos\alpha e^{j(\varphi+\phi)} & -\sin\alpha e^{j(-\varphi+\phi)} \\ \sin\alpha e^{j(\varphi-\phi)} & \cos\alpha e^{j(-\varphi-\phi)} \end{pmatrix} E_{in} e^{j\beta}$$

where $E_{out}$ represents an output electrical field value determined by applying a set of three rotations and/or phase retardations (e.g., based on a set of angles identified as $\phi$, $\alpha$, and $\sigma$) to an input electrical field value (e.g., $E_{in}$), and where $\beta$ represents a carrier phase. The term rotation, as used herein in the context of correcting the SOP of a polarization multiplexed signal, may include a rotation of the polarization multiplexed signal in a complex electrical field space in order to correct the SOP of the polarization multiplexed signal and/or a phase retardation of the polarization multiplexed signal in the complex electrical field space order to correct the SOP of the polarization multiplexed signal. Notably, Stokes parameters determined in the manner described below are independent of $\beta$ that is to be handled by carrier recovery component 440. The SOP change due to the three rotations and/or phase retardations may be interpreted in a Stokes space as a sequence of the three rotations of a spherical coordinate system. FIG. 6 is a diagram of a manner in which the SOP change may be expressed using three rotations of the Stokes space spherical coordinate system.

In order to properly demultiplex a polarization multiplexed signal at Rx DSP 350, the three rotations and/or phase retardations need to be determined, and an inverse operation is to be applied to information representing the polarization multiplexed signal. Notably, there is an unlimited number of ways to undo the SOP change, but a minimum number of rotations and/or phase retardations needed is three. An implementation including three rotations and phase retardations is described with regard to process 500.

As shown in FIG. 5, process 500 may include receiving tone information associated with a polarization multiplexed signal (block 505). For example, Stokes component 425 (e.g., included in Rx DSP 350) may receive tone information associated with a polarization multiplexed signal.

In some implementations, tone information may include information associated with a set of electric field values that represent received tones (e.g., block tones associated with performing carrier recovery, pilot tones associated with performing carrier recovery), and the received tones may correspond to a set of transmitted tones, included in a polarization multiplexed signal, with a known SOP. For example, optical transmitter 212 may include a first transmitted tone, represented by a first transmitted electric field (e.g., $E_{Tx,1}$), and a second transmitted tone, represented by a second transmitted electric field (e.g., $E_{Tx,2}$), in the polarization multiplexed signal. In some implementations, $E_{Tx,1}$ and $E_{Tx,2}$ may be represented by complex field values in two polarizations:

$$E_{Tx,1} = \begin{pmatrix} 1+j \\ 1+j \end{pmatrix},$$

$$E_{Tx,2} = \begin{pmatrix} 1+j \\ 1-j \end{pmatrix}$$

where the first row of each complex field value matrix corresponds to a first polarization (e.g., a transverse electric (TE) polarization) and the second row of each complex field value matrix corresponds to a second polarization (e.g., a transverse magnetic (TM) polarization). In the above example, $E_{Tx,1}$ may represent an electric field value that produces 45° linearly polarized light, and $E_{TX,2}$ may represent an electric field that produces circularly polarized light.

In some implementations, as in the above example, tone information associated with a at least two tones is needed. The two tones may be selected arbitrarily as long as an angle of Stokes vectors (e.g., representations of the complex electric field values) corresponding to the two tones is neither 0° (i.e., such that the tones are identical) or 180° (i.e., such that the tones are located on opposite sides of a Poincaré sphere). In these special prohibitive cases, there is a SOP rotation which is not accounted for by the two tones. In some implementations, for maximum sensitivity and/or convenience, two tones may be chosen such that the corresponding Stokes vectors form an angle of 90° degrees. For example, the angle between Stokes vectors corresponding to $E_{Tx,1}$ and $E_{TX,2}$ (e.g., $S_{Tx,1}$ and $S_{Tx,2}$, respectively) in the above example is 90°.

In some implementations, the tone information may include information that represents received tones that correspond to the transmitted tones. For example, Stokes component 425 may receive a first received electric field value (e.g., $E_{Rx,1}$) that represents a first received tone that corresponds to the first transmitted tone (e.g., $E_{Tx,1}$), and a second received electric field value (e.g., $E_{Rx,2}$) that represents a second received tone that corresponds to the second transmitted tone (e.g., $E_{Tx,2}$). In some implementations, the received tones may have a different SOP than the transmitted tones (e.g., due to a SOP change introduced in a transmission medium). As such, a change in the SOP across the transmission medium may be determined based on a difference between the SOP of the received tones and the known SOP of the transmitted tones. In some implementations, the change in the SOP of a received polarization multiplexed signal may be undone based on a set of polarization parameters that corresponds to the change in the SOP, as described below.

In some implementations, the tone information may include information associated with a set of block tones. For example, the tone information may include information representing two or more block tones associated with performing carrier recovery of the polarization multiplexed signal. Additionally, or alternatively, the tone information may include information associated with a set of pilot tones. For example, the tone information may include information representing two or more (e.g., out of band) pilot tones associated with performing carrier recovery of the polarization multiplexed signal.

In some implementations, Stokes component 425 may receive the tone information after LMS equalizer 415 receives and/or processes the information representing the polarization multiplexed signal, as illustrated by the example arrangements of FIGS. 4A and 4B. Additionally, or alternatively, Stokes component 425 may receive the tone information before LMS equalizer 415 receives and/or processes the information representing the polarization multiplexed signal, as illustrated by the example arrangement of FIG. 4C.

In some implementations, Stokes component 425 may receive the tone information while the information representing the polarization multiplexed signal is in the frequency domain (e.g., after FFT 405 transforms the information representing the signal to the frequency domain and before IFFT 420 transforms the signal to the time domain). In some implementations, Stokes component 425 may receive the tone information while the information representing the polarization multiplexed signal is in the time domain (e.g., after IFFT 420 transforms the signal to the time domain).

As further shown in FIG. 5, process 500 may include determining a first set of Stokes parameters based on the tone information (block 510). For example, Stokes component 425 may determine a first set of Stokes parameters based on the tone information. In some implementations, Stokes component 425 may determine the first set of Stokes parameters after Stokes component 425 receives the tone information.

In some implementations, Stokes component 425 may determine the first set of Stokes parameters based on a Stokes vector computed from the received tone information. A Stokes vector may include a vector represented by a set of Stokes parameters that may be computed based on the received tone information. A set of Stokes parameters (e.g., $S_0$, $S_1$, $S_2$, $S_3$, that describe a Stokes vector) may include a set of values that describe a polarization state of electromagnetic radiation (e.g., light). For example, Stokes component 425 may receive $E_{Rx,1}$ and $E_{Rx,2}$, and may compute a set of Stokes parameters that describe a SOP of $E_{Rx,1}$ and a set of Stokes parameters that describe a SOP of $E_{Rx,2}$ based on the following equations:

$$S_0 = E_{TE}E_{TE}^* + E_{TM}E_{TM}^*$$

$$S_1 = E_{TE}E_{TE}^* - E_{TM}E_{TM}^*$$

$$S_2 = E_{TE}E_{TM}^* + E_{TM}E_{TE}^*$$

$$S_3 = j(E_{TE}E_{TM}^* - E_{TM}E_{TE}^*)$$

where $E_{TE}$ is an electrical field value of $E_{Rx,1}$ or $E_{Rx,2}$ in the TE polarization, $E_{TE}^*$ is a complex conjugate of the electrical field value of $E_{Rx,1}$ or $E_{Rx,2}$ in the TE polarization, $E_{TM}$ is an electrical field value of $E_{Rx,1}$ or $E_{Rx,2}$ in the TM polarization, and $E_{TM}^*$ is a complex conjugate of the electrical field value of $E_{Rx,1}$ or $E_{Rx,2}$ in the TM polarization. In this example, Stokes component 425 may compute two sets of Stokes parameters, where each of the two sets of Stokes parameters may correspond to respective electric field values (e.g., $E_{Rx,1}$ and $E_{Rx,2}$) and may describe a Stokes vector (e.g., $S_{Rx1}$ and $S_{Rx,2}$).

In some implementations, Stokes component 425 may compute multiple Stokes vectors over a particular amount of time (e.g., an amount of time corresponding to a signal-to-noise ratio (SNR) associated with the polarization multiplexed signal), and may average the multiple Stokes vectors in order to reliably determine the sets of Stokes vectors. Alternatively, the received block tones (e.g. $E_{Rx,1}$ and $E_{Rx,2}$) may be averaged over a particular amount of time, and the Stokes vectors (e.g., $S_{Rx,1}$ and $S_{Rx,2}$) may be computed from averaged electric field values.

In some implementations, Stokes component 425 may determine a cross product based on the sets of Stokes vectors, corresponding to the received tone information, in order to determine the first set of Stokes parameters. For example, Stokes component 425 may receive $E_{Rx,1}$ and $E_{Rx,2}$, may compute the Stokes vectors corresponding to $E_{Rx,1}$ and $E_{Rx,2}$ (e.g., $S_{Rx,1}$ and $S_{Rx,2}$, respectively), and may compute a cross product of $S_{Rx,1}$ and $S_{Rx,2}$ (e.g., $S_{Rx,3}$):

$$S_{Rx,3} = S_{Rx,2} \times S_{Rx,1}$$

where $S_{Rx,3}$ may represent a Stokes vector that is perpendicular to both $S_{Rx,2}$ and $S_{Rx,1}$. In some implementations, the Stokes vector (e.g., $S_{Rx,3}$) represented by the cross product of the Stokes vectors corresponding to the received tone information (e.g., $S_{Rx,1}$ and $S_{Rx,2}$) may include the first set of Stokes parameters (e.g., $S0_{E3}$, $S1_{E3}$, $S2_{E3}$, $S3_{E3}$). The first set of Stokes parameters (e.g., corresponding to $S_{Rx,3}$) may be used in order to determine a polarization parameter corresponding to an operation associated with correcting the SOP of the polarization multiplexed signal, as described below.

As further shown in FIG. 5, process 500 may include determining a first polarization parameter based on the first set of Stokes parameters (block 515). For example, polarization parameters component 430 may determine a first polarization parameter based on the first set of Stokes parameters determined by Stokes component 425. In some implementations, polarization parameters component 430 may determine the first polarization parameter after Stokes component 425 determines the first set of Stokes parameters.

A polarization parameter may include a parameter that describes an operation to be applied to information representing a polarization multiplexed signal, where the operation represents a rotation associated with correcting a SOP of the polarization multiplexed signal. In some implementations, polarization parameters component 430 may determine a set of polarization parameters, as described below, and each polarization parameter may describe an operation that is to be applied to the information representing the polarization multiplexed signal. In some implementations, polarization parameters component 430 may determine three or more polarization parameters. In some implementations, a minimum of three operations is needed (i.e., a minimum of three rotations is needed in order to correct the SOP of the polarization multiplexed signal).

In some implementations, polarization parameters component 430 may determine the first polarization parameter based on the first set of Stokes parameters (e.g., $S0_{E3}$, $S1_{E3}$, $S2_{E3}$, $S3_{E3}$). In one example implementation, and continuing with the above example, polarization parameters component 430 may determine the first polarization parameter by providing a subset of the first set of Stokes parameters as input to the following equation:

$$\phi = \pi - \tan^{-1}\left(\frac{S3_{E3}}{S2_{E3}}\right)$$

where $\phi$ is the first polarization parameter associated with a first operation to be applied to the information representing the polarization multiplexed signal. In another example implementation, polarization parameters component 430 may determine the first polarization parameter using some other equation, such as another equation that determines the first polarization parameter based on the first set of polarization parameters. As another example, polarization parameters component 430 may determine the first polarization parameter based on a lookup table stored and/or accessible by polarization parameters component 430. For example, polarization parameters component 430 may provide the first set of Stokes parameters as input to a lookup table that stores pre-computed polarization parameters, and may receive, as an output, the first polarization parameter.

In some implementations, polarization parameters component 430 may store the first polarization parameter and/or may provide the first polarization parameter to Stokes component 425 (e.g., in order to allow Stokes component 425 to determine first rotated tone information and/or a second set of polarization parameters).

As further shown in FIG. 5, process 500 may include determining first rotated tone information based on the first polarization parameter and the tone information (block 520). For example, Stokes component 425 may determine first rotated tone information based on the first polarization parameter and the tone information. In some implementations, Stokes component 425 may determine the first rotated tone information after polarization parameters component 430 determines the first polarization parameter.

In some implementations, Stokes component 425 may determine the first rotated tone information based on the tone information and the first polarization parameter. For example, Stokes component 425 may apply an operation (e.g., representing a first rotation of the polarization multiplexed signal and corresponding to the first polarization parameter) to $E_{Rx,1}$ and $E_{Rx,2}$:

$$E'_{Rx,1} = \begin{pmatrix} e^{-j\phi} & 0 \\ 0 & e^{j\phi} \end{pmatrix} E_{Rx,1}$$

$$E'_{Rx,2} = \begin{pmatrix} e^{-j\phi} & 0 \\ 0 & e^{j\phi} \end{pmatrix} E_{Rx,2}$$

Notably, when determining the first rotated tone information (e.g., $E'_{Rx,1}$ and $E'_{Rx,2}$), the Jones matrixes associated with rotating the electrical field value, may be applied in reverse order (i.e., the rotation associated with $\phi$ may be applied first) and the polarization parameter associated with the first rotation (e.g., $\phi$) may be multiplied by −1. In this example, Stokes component 425 may then determine (e.g., in the manner described above) Stokes vectors corresponding to the first rotated tone information (e.g., $S'_{Rx,1}$ and $S'_{Rx,2}$). From the corresponding Stokes vectors, $S'_{Rx,1}$ and $S'_{Rx,2}$, Stokes component 425 may then determine a second set of Stokes parameters, as described below.

As further shown in FIG. 5, process 500 may include determining a second set of Stokes parameters based on the first rotated tone information (block 525). For example, Stokes component 425 may determine a second set of Stokes parameters based on the first rotated tone information. In some implementations, Stokes component 425 may determine the second set of Stokes parameters after Stokes component 425 determines the first rotated tone information.

In some implementations, Stokes component 425 may determine the second set of Stokes parameters based on the first rotated tone information in a manner similar to that described above with regard to block 510. For example, Stokes component 425 may compute a cross product (e.g., $S'_{Rx,3}$) of the Stokes vectors determined based on the first rotated tone information (e.g., $S'_{Rx,1}$ and $S'_{Rx,2}$), and may determine the second set of Stokes parameters (e.g., $S0_{E'3}$, $S1_{E'3}$, $S2_{E'3}$, $S3_{E'3}$) as the set of Stokes parameters that describe $S'_{Rx,3}$.

In some implementations, Stokes component 425 may provide the second set of Stokes parameters to polarization parameters component 430 in order to allow polarization parameters component 430 to determine a second polarization parameter.

As further shown in FIG. 5, process 500 may include determining a second polarization parameter based on the second set of Stokes parameters (block 530). For example, polarization parameters component 430 may determine a second polarization parameter based on the second set of Stokes parameters determined by Stokes component 425. In some implementations, polarization parameters component 430 may determine the second polarization parameter after Stokes component 425 determines the second set of Stokes parameters.

In some implementations, polarization parameters component 430 may determine the second polarization parameter based on the second set of Stokes parameters. In one example implementation, and continuing with the above example, polarization parameters component 430 may determine the second polarization parameter by providing a subset of the second set of Stokes parameters (e.g., $S0_{E'3}$, $S1_{E'3}$, $S2_{E'3}$, $S3_{E'3}$) as input to the following equation:

$$\alpha = \frac{1}{2}\left(\pi + \tan^{-1}\left(\frac{S2_{E'_3}}{S1_{E'_3}}\right)\right)$$

where α is the second polarization parameter associated with a second operation to be applied to the information representing the polarization multiplexed signal. In another example implementation, polarization parameters component 430 may determine the second polarization parameter using some other equation, such as another equation that determines the second polarization parameter based on the second set of polarization parameters. As another example, polarization parameters component 430 may determine the second polarization parameter based on a lookup table stored and/or accessible by polarization parameters component 430.

In some implementations, polarization parameters component 430 may store the second polarization parameter and/or may provide the second polarization parameter to Stokes component 425 (e.g., in order to allow Stokes component 425 to determine second rotated tone information and/or a third set of polarization parameters).

As further shown in FIG. 5, process 500 may include determining second rotated tone information based on the first polarization parameter, the second polarization parameter, and the tone information (block 535). For example, Stokes component 425 may determine second rotated tone information based on the first polarization parameter, the second polarization parameter, and the tone information. In some implementations, Stokes component 425 may determine the second rotated tone information after polarization parameters component 430 determines the second polarization parameter.

In some implementations, Stokes component 425 may determine the second rotated tone information based on the tone information, the first polarization parameter, and the second polarization parameter. Continuing with the above example, Stokes component 425 may apply a first operation (e.g., representing the first rotation of the polarization multiplexed signal and corresponding to the first polarization parameter) and a second operation (e.g., representing a second rotation of the second polarization multiplexed signal and corresponding to the second polarization parameter) to $E_{Rx,1}$ in order to determine the second rotated tone information (e.g., $E''_{Rx,1}$):

$$E''_{Rx,1} = \begin{pmatrix} \cos\alpha & \sin\alpha \\ -\sin\alpha & \cos\alpha \end{pmatrix} \begin{pmatrix} e^{-j\phi} & 0 \\ 0 & e^{j\phi} \end{pmatrix} E_{Rx,1}$$

Notably, when determining the second rotated tone information, the Jones matrixes associated with rotating the electrical field value, may be applied in reverse order (i.e., the rotation associated with ϕ may be applied first, the rotation associated with α may be applied second) and the polarization parameters associated with the first rotation and the second rotation (e.g., ϕ and α) may be multiplied by −1. In this example, Stokes component 425 may then determine (e.g., in the manner described above) a Stokes vector (e.g., $S''_{Rx,1}$) corresponding to the second rotated tone information (e.g., $E''_{Rx,1}$). From the corresponding Stokes vector, $S''_{Rx,1}$, Stokes component 425 may then compute a third set of Stokes parameters, as described below.

As further shown in FIG. 5, process 500 may include determining a third set of Stokes parameters based on the second rotated tone information (block 540). For example, Stokes component 425 may determine a third set of Stokes parameters based on the second rotated tone information. In some implementations, Stokes component 425 may determine the third set of Stokes parameters after Stokes component 425 determines the second rotated tone information.

In some implementations, Stokes component 425 may determine the third set of Stokes parameters based on the second rotated tone information in a manner similar to that described above with regard to block 510. For example, Stokes component 425 may determine a Stokes vector (e.g., $S''_{Rx,1}$) corresponding to the second rotated tone information (e.g., $E''_{Rx,1}$), and may determine the third set of Stokes parameters (e.g., $S0_{E'1}$, $S1_{E'1}$, $S2_{E'1}$, $S3_{E'1}$) as the set of Stokes parameters that describe $S''_{Rx,1}$.

In some implementations, Stokes component 425 may provide the third set of Stokes parameters to polarization parameters component 430 in order to allow polarization parameters component 430 to determine a third polarization parameter.

As further shown in FIG. 5, process 500 may include determining a third polarization parameter based on the third set of Stokes parameters (block 545). For example, polarization parameters component 430 may determine a third polarization parameter based on the third set of Stokes parameters determined by Stokes component 425. In some implementations, polarization parameters component 430 may determine the third polarization parameter after Stokes component 425 determines the third set of Stokes parameters.

In some implementations, polarization parameters component 430 may determine the third polarization parameter based on the third set of Stokes parameters. In one example implementation, and continuing with the above example, polarization parameters component 430 may determine the third polarization parameter by providing a subset of the third set of Stokes parameters (e.g., $S0_{E'1}$, $S1_{E'1}$, $S2_{E'1}$, $S3_{E'1}$) as input to the following equation:

$$\varphi = -\tan^{-1}\left(\frac{S3_{E'1}}{S2_{E'1}}\right)$$

where ϕ is the third polarization parameter associated with a third operation to be applied to the information representing the polarization multiplexed signal. In another example implementation, polarization parameters component 430 may determine the third polarization parameter using some other equation, such as another equation that determines the third polarization parameter based on the third set of polarization parameters. As another example, polarization parameters component 430 may determine the third polarization parameter based on a lookup table stored and/or accessible by polarization parameters component 430.

In some implementations, polarization parameters component 430 may store the third polarization parameter and/or may provide the first polarization parameter, the second polarization parameter, and the third polarization parameter to polarization controller 435-1 and/or polarization controller 435-2. Notably, when the tone information includes information representing block tones, the set of polarization parameters may be determined only for received block tones. As such, the computation may take place at a significantly lower rate than data throughput.

As further shown in FIG. 5, process 500 may include applying a set of operations to information representing the polarization multiplexed signal based on the first polarization parameter, the second polarization parameter, and the third polarization parameter (block 550). For example, polarization controller 435-1 may apply a set of operations to the information representing the polarization multiplexed signal based on the first polarization parameter, the second polarization parameter, and the third polarization parameter. In some implementations, polarization controller 435-1 may apply the set of operations when polarization controller 435-1 receives the first polarization parameter, the second polarization parameter, and the third polarization parameter from polarization parameters component 430.

In some implementations, the set of operations may represent a set of rotations associated with correcting the SOP of the polarization multiplexed signal. For example, each operation, of the set of operations, may be applied to the information representing the polarization multiplexed signal, and may represent respective rotations associated with correcting the SOP of the polarization multiplexed signal.

In some implementations, polarization controller 435-1 may apply the set of operations by applying a first operation (e.g., corresponding to a first rotation), a second operation (e.g., corresponding to a second rotation), and a third operation (e.g., corresponding to a third rotation) using the first polarization parameter (e.g., $\phi$), the second polarization parameter (e.g., $\alpha$), and the third polarization parameter (e.g., $\phi$), respectively. In some implementations, polarization controller 435-1 may determine corrected information representing the polarization multiplexed signal (e.g., information representing the polarization multiplexed signal with a corrected SOP) based on applying the set of operations to the information representing the polarization multiplexed signal. In this way, polarization controller 435-1 may undo (e.g., in the information representing the polarization multiplexed signal) an effect of the SOP change experienced in by polarization multiplexed signal along the transmission medium.

In some implementations, polarization controller 435-2 may reverse the set of operations applied by polarization controller 435-1 (e.g., for purposes of LMS equalizer 415 adaptation). For example, polarization controller 435-1 may apply the set of operations to the information representing the polarization multiplexed signal, may demultiplex the information representing the polarization demultiplexed signal, and may provide the information representing the demultiplexed signal to carrier recovery component 440. Carrier recovery component 440 may apply a phase correction to the information representing the demultiplexed signal, and may forward the information representing the signal (e.g., for further processing by Rx DSP). Error component 450 may compute a signal error, associated with adapting LMS equalizer 415, and may provide, to LMS equalizer 415, the error signal via carrier rotation component 455 (e.g., such that the phase correction applied by carrier recovery component 440 may be undone) and polarization controller 435-2 (e.g., such that the operations applied by polarization controller 435-1 may be reversed).

Since the above described method (using block tones or pilot tones) is data-aided (e.g., reliant on sent symbols that are known to Rx DSP 350), a modulation format of the polarization multiplexed signal may be irrelevant to the SOP correction. Additionally, signals in the two polarizations may have a fixed phase with respect to each other and may never be swapped and/or degenerated. Moreover, a tracking speed associated with the SOP correction may be adjusted by the amount of tones that are sent (e.g., allowing for a trade-off between SOP tracking capability and system overhead).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

While example process 500 describes a particular manner in which to determine the set of polarization parameters, in some implementations, the set of polarization parameters may be determined in another manner (e.g., using other equations, additional equations, different equations, etc.). Additionally, while example process 500 describes a set of three polarization parameters, in some implementations, the set of polarization parameters may include more than three polarization parameters.

Implementations described herein may relate to an optical receiver configured to use tone information as a complement to an LMS equalizer for purposes of performing polarization tracking. In this way, the highly efficient, yet relatively slow, LMS equalizer in the frequency domain may be complemented by a data-aided ultra-fast time domain polarization tracking filter.

The foregoing disclosure provides illustration and description, but is not intended to be exhaustive or to limit the implementations to the precise form disclosed. Modifications and variations are possible in light of the above disclosure or may be acquired from practice of the implementations. For example, while the processes and/or methods described herein are described in the context of use within a coherent Rx DSP, these processes and/or methods may also be applied in another context, such as within a measurement device (e.g., a polarimeter) associated with providing information regarding a SOP change.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical receiver, comprising: a local oscillator including a laser that supplies a reference optical signal; a hybrid mixer that receives a polarization multiplexed signal carrying a set of tones and the reference optical signal, the hybrid mixer supplying a plurality of optical components; a plurality of photodiodes that receive the plurality of optical components and outputs a plurality of voltage signals; an analog-digital-converter (ADC) that receives the plurality of voltage signals; a digital signal processor (DSP) configured to: receive signals from the ADC indicative of information representing the polarization multiplexed signal, the information representing the polarization multiplexed signal including first information associated with a first data rate, and second information associated with a second data rate different than the first data rate, the second information being tone information representing the set of tones the set of tones being associated with performing carrier recovery for the polarization multiplexed signal, the set of tones constituting a plurality of symbols, and the polarization multiplexed signal having an uncorrected state of polarization (SOP); determine sets of Stokes parameters based on the tone information, a set of Stokes parameters, of the sets of Stokes parameters, including information indicative of the SOP of the polarization multiplexed signal; determine a set of polarization parameters based on the sets of Stokes parameters; and apply, based on the set of polarization parameters, a set of operations to the information representing the polarization multiplexed signal, an operation, of the set of operations, representing a rotation or a phase retardation of the polarization multiplexed signal and corresponding to a polarization parameter of the set of polarization parameters, and the set of operations being applied to the information representing the polarization multiplexed signal in order to generate corrected information, the corrected information including information representing the polarization multiplexed signal with a corrected SOP.

2. The optical receiver of claim 1, where the tone information includes information associated with two or more block tones.

3. The optical receiver of claim 1, where the set of polarization parameters includes three or more polarization parameters and the set of operations includes three or more operations.

4. The optical receiver of claim 1, where the tone information includes electrical field information in a time domain.

5. The optical receiver of claim 1, where the DSP, when determining the set of polarization parameters, is to: retrieve a polarization parameter, of the set of polarization parameters, from a lookup table based on a set of Stokes parameters of the sets of Stokes parameters.

6. The optical receiver of claim 1, where the DSP is further to: apply another set of operations to an error signal associated with the polarization multiplexed signal, said another set of operations being applied to reverse an effect of applying the set of operations, and said another set of operations being applied before the error signal is received by an adaptive filter included in the DSP.

7. The optical receiver of claim 1, where the DSP is to apply the set of operations in order to complement a performance of least mean squares (LMS) equalization performed by the optical receiver.

8. A system comprising, an optical transmitter that supplies a polarization multiplexed optical signal, the polarization multiplexed optical signal carrying a set of tones; an optical receiver, the optical receiver including: a local oscillator including a laser that supplies a reference optical signal; a hybrid mixer that receives a polarization multiplexed signal and the reference optical signal, the hybrid mixer supplying a plurality of optical components; a plurality of photodiodes that receives the plurality of optical components and outputs a plurality of voltage signals; an analog-digital-converter (ADC) that receives the plurality of voltage signals; the optical receiver configured to: obtain information that represents the polarization multiplexed signal based on the plurality of voltage signals, the information that represents the polarization multiplexed signal including first information and second information, the second information being tone information that represents the set of tones associated with performing carrier recovery for the polarization multiplexed signal, the set of tones constituting a plurality of symbols, and the polarization multiplexed signal having an uncorrected state of polarization (SOP); compute Stokes parameters based on the tone information, a subset of Stokes parameters, of the Stokes parameters, including information indicative of the SOP of the polarization multiplexed signal; compute a group of polarization parameters based on the Stokes parameters; apply, based on the group of polarization parameters, a plurality of operations to the information that represents the polarization multiplexed signal, an operation, of the plurality of operations, representing a rotation or a phase retardation of the polarization multiplexed signal and corresponding to a polarization parameter of the group of polarization parameters, and the plurality of operations being applied to the information that represents the polarization multiplexed signal in order to generate corrected information that includes information that represents the polarization multiplexed signal with a corrected SOP.

9. The system of claim 8, where the tone information includes information associated with at least two pilot tones.

10. The system of claim 8, where the group of polarization parameters includes at least three polarization parameters and the plurality of operations includes at least three operations.

11. The system of claim 8, where the optical receiver, when computing the group of polarization parameters, is to: retrieve a polarization parameter, of the group of polarization parameters, from a lookup table based on one or more Stokes parameters of the Stokes parameters.

12. The system of claim 8, where the optical receiver is further to: apply another plurality of operations to an error signal associated with the polarization multiplexed signal, said another plurality of operations being applied to reverse an effect of applying the plurality of operations, and said another plurality of operations being applied before the error signal is filtered by the optical receiver.

13. The system of claim 8, where the tone information includes electrical field information in a time domain.

14. The system of claim 8, where the tone information includes electrical field information in the frequency domain.

15. A method, comprising: supplying a polarization multiplexed signal to a receiver, the polarization multiplexed signal carrying a set of tones, the receiver including a local oscillator, a plurality of photodiodes, an analog-digital-converter (ADC), and a digital signal processor, generating a reference optical signal with the local oscillator, the local oscillator including a laser; mixing the reference optical signal with the polarization multiplexed signal to generate a plurality of optical components; supplying the plurality of optical components to the plurality of photodiodes to generate a plurality of voltage signals; receiving the plurality of voltage signals with the analog-digital-converter (ADC), the ADC providing signals based on the plurality of voltage signals; receiving, by the digital signal processor (DSP), the signals from the ADC, the signals being indicative of information representing a polarization multiplexed sign, the information representing the polarization multiplexed signal including tone information representing a set of tones associated with performing carrier recovery for the polarization multiplexed signal, and the polarization multiplexed signal having an uncorrected state of polarization (SOP); determining, by the DSP, a first set of Stokes parameters based on the tone information, the first set of Stokes parameters including information indicative of the uncorrected SOP of the polarization multiplexed signal; determining, by the DSP, a first polarization parameter based on the first set of Stokes parameters, the first polarization parameter corresponding to a first operation to be applied to the information representing the polarization multiplexed signal; determining, by the DSP, a second set of Stokes parameters based on the tone information and the first polarization parameter, the second set of Stokes parameters including information indicative of a SOP of the polarization multiplexed signal that results from applying a first rotation or a first phase retardation to the polarization multiplexed signal, the first rotation or the first phase retardation corresponding to the first operation to be applied to the information representing the polarization multiplexed signal; determining, by the DSP, a second polarization parameter based on the second set of Stokes parameters, the second polarization parameter corresponding to a second operation to be applied to the information representing the polarization multiplexed signal; determining, by the DSP, a third set of Stokes parameters based on the tone information, the first polarization parameter, and the second polarization parameter, the third set of Stokes parameters including information indicative of a SOP of the polarization multiplexed signal that results from applying the first rotation or the first phase retardation and a second rotation or a second phase retardation to the polarization multiplexed signal, the second rotation or the second phase retardation corresponding to the second operation to be applied to the information representing the polarization multiplexed signal; determining, by the DSP, a third polarization parameter based on the third set of Stokes parameters, the third polarization parameter corresponding to a third operation to be applied to the information representing the polarization multiplexed signal; and applying, by the DSP, the first operation, the second operation, and the third operation, corresponding to the first polarization parameter, the second polarization parameter, and the third polarization parameter, respectively, to the information representing the polarization multiplexed signal, the first operation, the second operation, and the third operation being applied to the information representing the polarization multiplexed signal in order to generate corrected information, the corrected information including information representing the polarization multiplexed signal with a corrected SOP.

16. The method of claim 15, where the tone information includes information associated with a plurality of block tones.

17. The method of claim 15, where determining the first polarization parameter, the second polarization parameter, or the third polarization parameter comprises: retrieving the first polarization parameter, the second polarization parameter, or the third polarization parameter from a lookup table.

18. The method of claim 15 further comprising: generating an error signal associated with the polarization multiplexed signal; and applying a fourth operation, a fifth operation, and a sixth operation to the error signal associated with the polarization multiplexed signal, the fourth operation, the fifth operation, and the sixth operation being applied to reverse an effect of the first operation, the second operation, and the third operation.

19. The method of claim 15 further comprising applying the first operation, the second operation, and the third operation to the information representing the polarization multiplexed signal in order to complement a performance of an adaptive equalizer included in an optical receiver.

20. The method of claim 15, where the tone information includes electrical field information in the frequency domain.

* * * * *